United States Patent
Maattanen et al.

(10) Patent No.: US 8,855,026 B2
(45) Date of Patent: Oct. 7, 2014

(54) COOPERATIVE MULTIPOINT SCHEME SELECTION CODEBOOK

(75) Inventors: Helka-Liina Maattanen, Helsinki (FI); Mihai Enescu, Espoo (FI); Tommi Koivisto, Espoo (FI)

(73) Assignee: Broadcom Corporation, Irvine, CA (US)

( * ) Notice: Subject to any disclaimer, the term of this patent is extended or adjusted under 35 U.S.C. 154(b) by 252 days.

(21) Appl. No.: 13/291,417

(22) Filed: Nov. 8, 2011

(65) Prior Publication Data
US 2013/0114427 A1    May 9, 2013

(30) Foreign Application Priority Data
Nov. 4, 2011   (GB) .................................. 1119092.3

(51) Int. Cl.
H04L 12/28 (2006.01)
H04L 12/18 (2006.01)
H04B 7/06 (2006.01)
H04B 7/02 (2006.01)
H04J 1/16 (2006.01)

(52) U.S. Cl.
CPC ............ *H04B 7/024* (2013.01); *H04L 12/1868* (2013.01); *H04B 7/063* (2013.01); *H04B 7/0689* (2013.01); *H04B 7/0632* (2013.01); *H04L 12/189* (2013.01); *H04B 7/0639* (2013.01)
USPC ........... 370/278; 370/252; 370/282; 370/329; 370/430; 370/436

(58) Field of Classification Search
CPC .............................. H04W 72/04; H04W 24/10
USPC ................... 370/252, 278, 282, 329, 430, 436
See application file for complete search history.

(56) References Cited

U.S. PATENT DOCUMENTS

| 8,724,572 B2 * | 5/2014 | Schober et al. ............... 370/329 |
| 2012/0113831 A1 * | 5/2012 | Pelletier et al. ............... 370/252 |
| 2013/0083681 A1 * | 4/2013 | Ebrahimi Tazeh Mahalleh et al. ............................ 370/252 |

OTHER PUBLICATIONS

EP Combined Search and Examination Report under Sections 17 and 18(3) issued for corresponding GB Patent Application No. GB 119092.3 mailed Feb. 20, 2012.
3GPP TR 36.819 v1 1.0.0, Sep. 2011, Coordinated multi-point operation for LTE physical layer aspects.
R1-112896, 3GPP TSG RAN WG1 Meeting #66 bis, Zhuhai, China, Oct. 10-14, 2011, "Framework for multi-point CSI feedback enhancements for CoMP", Huawei, HiSilicon, 9 pgs.
R1-113292, 3GPP TSG RAN WG1 Meeting #66bis, Zhuhai, China, Oct. 10-14, 2011, "CSI Feedback Scheme for JP CoMP" NTT DOCOMO, 9 pgs.

(Continued)

*Primary Examiner* — John Pezzlo
(74) *Attorney, Agent, or Firm* — Stanton IP Law

(57) ABSTRACT

A network sends to a user equipment UE a reference signal configuration, and from receiving it the UE selects a codeword identifying a cooperative multipoint CoMP transmission scheme. There is a CoMP scheme selection codebook from which the UE selects the codeword corresponding to its recommended CoMP scheme. The UE sends to the network that codeword which identifies the CoMP transmission scheme, along with the CSI feedback characterizing the CoMP transmission scheme. From that codeword which the network receives it determines the UE's assumed CoMP transmission scheme, which the network uses to determine how the CSI feedback, received from the UE, was calculated by the UE (for example, joint transmission, or dynamic point selection with or without muting, or coordinating scheduling/beamforming). The network uses this information for selecting a CoMP transmission scheme for downlink CoMP transmissions to the UE.

20 Claims, 5 Drawing Sheets

(56) References Cited

OTHER PUBLICATIONS

R1-112987, 3GPP TSG RAN WG1 Meeting #66bis, Zhuhai, China, Oct. 10-14, 2011, "High level view on DL CoMP schemes", New Postcom, 2 pgs.

R1-113353, 3GPP TSG-RAN WG1 #66bis, Zhuhai, China, Oct. 10-14, 2011, "Discussions on DL CoMP Schemes", Ericsson, ST-Ericsson, 4 pgs.

R1-113276, 3GPP TSG RAN WG1 Meeting #66bis, Zhuhai, China, Oct. 10-14, 2011, "CQI calculation for CoMP", LG Electronics, 5 pgs.

R1-113354, 3GPP TSG-RAN WG1 #66 bis, Zhuhai, China, Oct. 10-14, 2011, "Hierarchical Feedback for DL CoMP and DL MIMO", Ericsson, ST-Ericsson, 6 pgs.

\* cited by examiner

|  | JT | DPS + muting | CS/CB + muting |
|---|---|---|---|
| Feedback | 1) Per point PMI/CQI (+ combiner)<br>2) Per point PMI (+combiner) + aggregated CQI + serving point CQI<br>3) Aggregated PMI/CQI + serving point PMI/CQI | Per point PMI/CQI + point selection + possible muting indication | Per point PMI/CQI or CS/CB + muting specific additional feedback |
| Channel estimation | Per point CSI-RS or aggregated single CSI-RS pattern | Per point CSI-RS | Serving point CSI-RS+possibly other point CSI-RS |

Figure 1: Prior Art

COOPERATIVE MULTIPOINT SCHEME SELECTION CODEBOOK

CROSS REFERENCE TO RELATED APPLICATION

This application claims benefit under 35 U.S.C. §119(a) and 37 CFR 1.55 to UK Patent Application 1119092.3, filed on Nov. 4, 2011.

TECHNICAL FIELD

The exemplary and non-limiting embodiments of this invention relate generally to wireless communication systems, methods, devices and computer programs and, more specifically, relate to channel configurations and related control signaling for multipoint communications between a network and a user equipment.

BACKGROUND

The following abbreviations that may be found in the specification and/or the drawing figures are defined as follows:
- 3GPP third generation partnership project
- BS base station
- CB coordinated beamforming
- CoMP coordinated multipoint transmission/reception
- CS coordinated scheduling
- CSI channel state information
- CSI-RS CSI-reference symbols
- CQI channel quality indicator
- DM-RS demodulation reference symbols
- eNB evolved NodeB (BS of a LTE/LTE-A system)
- JP joint processing
- JT joint transmission
- LTE long term evolution (evolved UTRAN)
- LTE-A long term evolution advanced
- MIMO multiple-input multiple-output
- MU multi-user
- PMI precoding matrix indicator
- RF radiofrequency
- RI rank indicator
- RRH remote radio head
- RSRP reference signal received power
- SINR signal to interference-plus-noise ratio
- SU single-user
- TX transmission
- UE user equipment
- UTRAN universal terrestrial radio access network In the 3GPP LTE and LTE-A systems, interference is a limiting factor for single cell single-user (SU-) and multi-user (MU-) multiple-input multiple-output (MIMO) network performance. This is particularly true at the cell edge, and for this reason CoMP has been introduced. In the CoMP concept, for the DL there are multiple points which cooperate in scheduling and transmission for a single UE in order to strengthen the desired signal and to mitigate inter-cell interference. In practice these multiple transmission points may be base stations (eNBs in the LTE/LTE-A systems), remote radio heads and the like, or some combination of them. In the 3GPP definition (see 3GPP TR 36.819) for CoMP, a set of geographically co-located transmit antennas and the sectors of the same site correspond to different points. It should be noted that a cell is formed by one or multiple points.

The above 3GPP technical report was approved after the RAN#1 meeting and it was agreed to focus further work for specifying CoMP in the LTE/LTE-A systems on joint transmission (JT), dynamic point selection (DPS, including dynamic point blanking/muting), and coordinated beamforming/coordinated scheduling (CB/CS, also including dynamic point blanking/muting).

In JT CoMP two or more points transmit simultaneously to a CoMP user. In DPS CoMP the transmission point is switched according to changes in signal quality. In CB/CS CoMP the scheduling decisions of neighbor points are coordinated in order to reduce interference. In principle any of these CoMP schemes may include blanking/muting which means that transmissions from one or more transmission points are blanked/muted in order to decrease their interference to one or more other CoMP transmission points which is not blanked/muted.

There are at least four distinct CoMP scenarios to consider, known as follows among the 3GPP study group/work item for CoMP. These address both intra-cell and inter-cell CoMP schemes operating in homogeneous and in heterogeneous network deployment environments. Scenario #1 is intra-site CoMP; scenario #2 is inter-site CoMP with a high power RRH; scenario #3 is CoMP with a low power RRH within the coverage area of the macro cell and having different cell identities IDs; and scenario 4 is the same as scenario 3 but with the same cell identities between the macro and the RRHs. CoMP for LTE/LTE-A is to be operative for both frequency division duplexing FDD and time division duplexing TDD, and so it is advantageous that solutions for how to implement CoMP are unified for both duplexing schemes. These teachings are relevant to CSI feedback from the UE to the eNB in support of at least these above CoMP techniques.

From the UE's perspective there are two different sets for CoMP. There is a CoMP measurement set, formed by M cells/points for which the UE is measuring channel state information CSI. And there is the UE's CoMP reporting set, which is the N cells/points defining the number of points involved in the actual CoMP scheme and so is made up of the points for which CSI feedback is reported. It is assumed that the CoMP reporting set will typically consist of two to three points. The CoMP reporting set could be equivalent to the CoMP measurement set so members of the reporting set N are elements of the measuring set M. The number of points involved in a CoMP scheme (those transmission points which are cooperating) does not need to be signaled to the UE or mentioned in specifications according to the current understanding in 3GPP but is left for network implementation. The point from which the UE would receive a transmission in single-cell mode is defined as the serving point.

In 3GPP Release 10 there are different reference signals defined for CSI estimation (CSI-RS) and data demodulation (DM-RS) purposes. There is also specified PDSCH resource element muting, which allows for multi-cell channel estimation. It is agreed that CSI feedback will be implicit, consisting of rank indicator (RI) report, precoding matrix index (PMI) and a channel quality indicator (CQI). From the UE's perspective it will estimate the channel, select the rank and PMI and calculate the post-processing (after receiver) SINR and from those derive the CQI. Thus the CQI in this approach may be seen as indicative of the post processing SINR. Release 10 feedback operates per point, but certain CoMP variations provide that a UE may receive CSI-RS resources from more than one point. Additionally, it is possible to have a single feedback that is aggregated over multiple CSI-RS resources, or per point (per CSI-RS resource). Further, the per-point PMIs may be improved by a combiner feedback, which is an inter-point phase and/or an amplitude value. FIG. 1 summarizes the feedback and channel estimation options for each of the above CoMP schemes.

Since there are several different transmission schemes/hypothesis outlined above, a problem arises in that the CQI feedback from the UE may be computed on a transmission scheme/hypothesis the UE assumes is in use which does not match what the network is actually employing. The network uses CQI for scheduling and to perform adaptive modulation and coding, which means the transmission rate is adapted based on channel conditions as reported by the UE. Inaccuracy in the CQI value can greatly affect system performance. For example, if CQI is reported to be better than the actual channel conditions the network may assign a transmission rate that is too high for the radio link to support, resulting in high error rates and re-transmissions which as a consequence degrade throughput.

The CQI which the UE reports in a CoMP environment depends on the transmission scheme/hypotheses made by the UE at a given time. For example:
  When reporting an aggregated JT CQI, the UE assumes there was a simultaneous transmission from N points to the UE.
  When reporting a DPS CQI without muting, the UE assumes the transmission was from a (single) selected point and there may be interference from other points.
  When reporting a DPS CQI with muting, the UE assumes the transmission was from one point and that there is zero interference from the other points that are assumed to be muted.

So there are multiple methods of calculating the CQI, and the CQI which the UE reports depends on the CoMP transmission scheme/hypothesis the UE assumes. What is needed in the art is a way for the UE and the network to have a common understanding of the CoMP scheme relevant to the CQI being reported by the UE.

SUMMARY

The foregoing and other problems are overcome, and other advantages are realized, by the use of the exemplary embodiments of this invention.

In a first exemplary embodiment of the invention there is an apparatus comprising at least one processor and at least one memory storing a computer program. In this embodiment the at least one memory with the computer program is configured with the at least one processor to cause the apparatus to at least: select a codeword identifying a cooperative multipoint transmission scheme based on a received reference signal configuration; and send to at least one network node the codeword identifying the selected cooperative multipoint transmission scheme.

In a second exemplary embodiment of the invention there is a method comprising: selecting a codeword identifying a cooperative multipoint transmission scheme based on a received reference signal configuration; and sending to at least one network node the codeword identifying the selected cooperative multipoint transmission scheme.

In a third exemplary embodiment of the invention there is a computer readable memory storing a computer program executable by at least one processor, the computer program comprising: code for selecting a codeword identifying a cooperative multipoint transmission scheme based on a received reference signal configuration; and code for sending to at least one network node the codeword identifying the selected cooperative multipoint transmission scheme.

In a fourth exemplary embodiment of the invention there is an apparatus comprising at least one processor and at least one memory storing a computer program. In this embodiment the at least one memory with the computer program is configured with the at least one processor to cause the apparatus to at least: determine a cooperative multipoint transmission scheme from a codeword received from a user equipment; and use the determined cooperative multipoint transmission scheme to determine how a feedback measure received from the user equipment was calculated for selecting a cooperative multipoint transmission scheme for downlink transmissions to the user equipment.

In a fifth exemplary embodiment of the invention there is a method comprising: determining a cooperative multipoint transmission scheme from a codeword received from a user equipment; and using the determined cooperative multipoint transmission scheme to determine how a feedback measure received from the user equipment was calculated for selecting a cooperative multipoint transmission scheme for downlink transmissions to the user equipment.

In a sixth exemplary embodiment of the invention there is a computer readable memory storing a computer program executable by at least one processor, the computer program comprising: code for determining a cooperative multipoint transmission scheme from a codeword received from a user equipment; and code for using the determined cooperative multipoint transmission scheme to determine how a feedback measure received from the user equipment was calculated for selecting a cooperative multipoint transmission scheme for downlink transmissions to the user equipment

BRIEF DESCRIPTION OF THE DRAWINGS

FIG. 1 is a summary of prior art feedback for various different cooperative multipoint transmission schemes.

DETAILED DESCRIPTION

Figure 2:
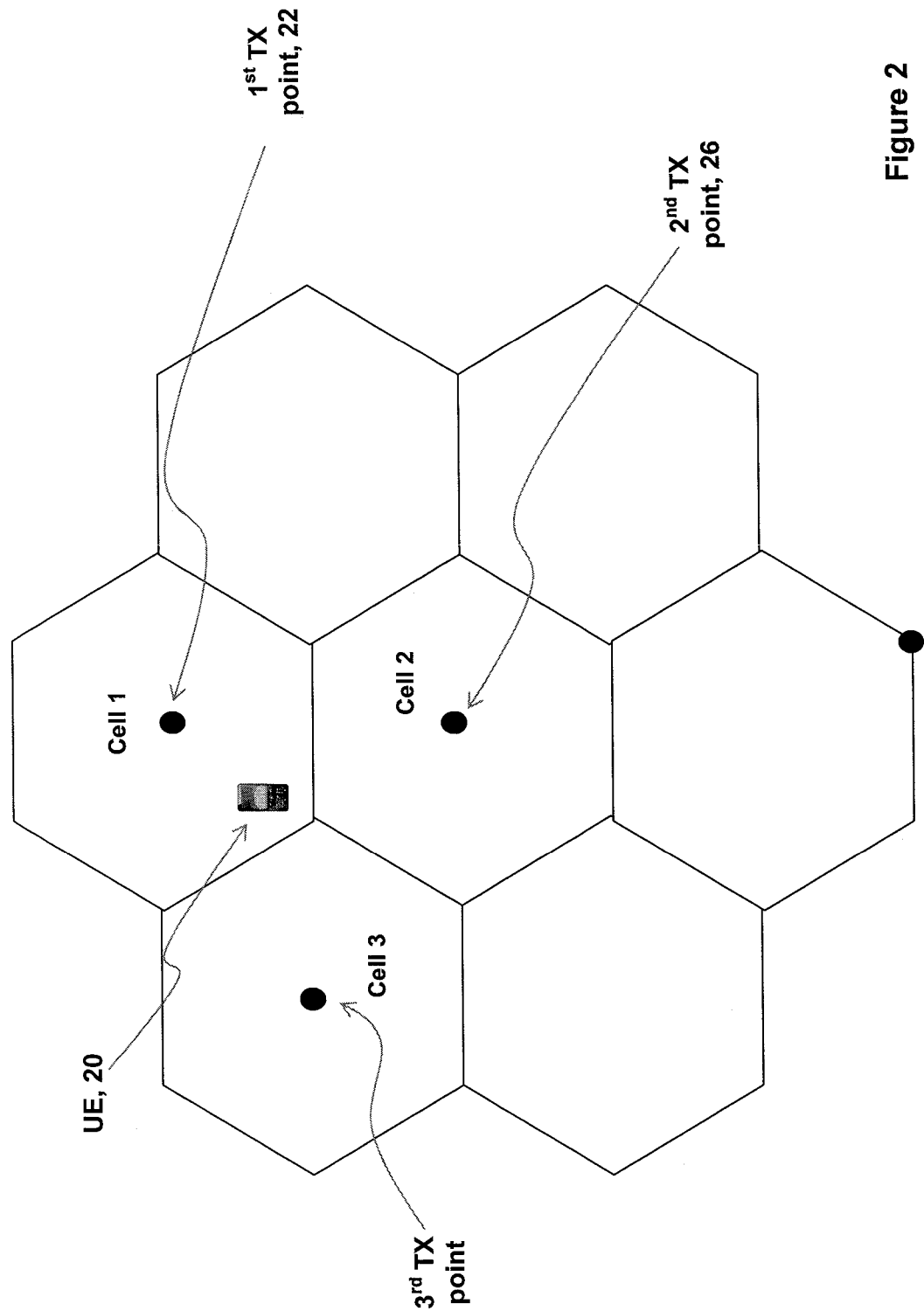
FIG. 2 is a schematic diagram of adjacent eNBs with a UE moving amongst their cells and is an environment in which embodiments of the invention may be advantageously practiced.

FIG. 2 is a visual overview of a CoMP environment in which exemplary embodiments of the invention may be practiced to advantage. There is a UE 20 under control of a serving cell denoted as the first TX point 22. The UE is also within range of a second TX point 26 and a third TX point (not numbered), and assume each of these three are in the UE's measurement set. While FIG. 2 presents three conventional network nodes, recognize that for a heterogeneous network there may be also what is termed in LTE/LTE-A as pico or femto nodes whose coverage area is smaller and may be fully enveloped by the illustrated coverage area (cell) of one of the illustrated macro nodes/eNBs. There may also be remote radio heads with coverage areas of varying sizes to fill coverage 'holes' from a given eNB or to extend its range.

Conventionally the geographic area controlled by an eNB is served by directional antennas. A given eNB may control several cells, typically arranged in different sectors (e.g., three or six sector sites). While cell 1 and cell 2 may be considered from the network perspective as different sectors of the same eNB cell, since each sector has a different physical configuration the UE sees each sector as a different cell. Similarly, if an eNB also has relay nodes and/or RRHs, the UE may in some cases also see those as separate cells rather than distinct sectors under a given eNB's control (as in scenario #3 above) while in other cases there may be one cell with multiple other points under the same macro cell (such as scenario #4 above). Any of these various nodes, eNBs, RRHs, relay nodes, and pico/femto cells, are considered a distinct transmission point for CoMP purposes.

At the 3GPP RAN1 #66bis meeting (Zhuhai, China; 10-14 Oct. 2011) mentioned above the definition of CSI resource was agreed to refer to a combination of "resourceConfig" and "subframeConfig" which are configured by higher layers. It was also agreed to standardize a common feedback/signaling framework suitable for scenarios 1-4 detailed in the background section above that can support CoMP JT, DPS and CS/CB. The feedback scheme is to be composed from one or more of the following, including at least one of the first three items below ('Rel-8' represents LTE Release 8):

feedback aggregated across multiple CSI-RS resources
per-CSI-RS-resource feedback with inter-CSI-RS-resource feedback
per-CSI-RS-resource feedback
per cell Rel-8 CRS-based feedback Note also that the use of sounding reference signals SRS may be taken into account when reaching further agreements.

There needs to be a common understanding at the UE and at the wireless network concerning the UE transmission hypothesis used for a given CQI report that the UE sent. At the same time the feedback scheme should be flexible enough to support as many CoMP schemes as needed. A straightforward solution might be for the UE to report CSI feedback for all the various CoMP hypotheses which the network might be using, but this would represent a very high uplink overhead. A more efficient solution is presented below.

Various other CoMP solutions have been proposed already at the RAN WG1 meeting #66bis mentioned above (Zhuhai, China; 10-14 Oct. 2011), namely documents R1-112896 by Huawei; R1-113353 and 113354 by Ericsson; R1-113276 by LG Electronics; R1-112987 by New Postcom; and R1-113292 by Docomo. 3GPP TR 36.819 currently provides that the baseline CSI feedback is individual per-point feedback, with or without complementary inter-point feedback. The above previously proposed solutions appear consistent with that baseline.

According to an exemplary embodiment of these teachings there is a CoMP scheme selection codebook, stored in the local memories of the UE and of the various network nodes/transmission points involved in the CoMP with the UE, which is used so that the UE may efficiently signal just what CoMP scheme/hypothesis the UE used when computing the CSI feedback report it is sending. The UE uses the codebook with reference to its CoMP hypothesis to find one particular codeword which the UE sends uplink; the network nodes/transmission points use the codeword they receive from the UE to find from the codebook just what hypothesis the UE used and therefore to know exactly what the UE's reported CSI feedback represents. The codewords of the codebook define the CoMP scheme selection including point blanking/muting options. Each entry in the codeword characterizes the operation of the corresponding transmission point in the CoMP scheme. In the particular examples below a transmission point may be thought of as being transmitting in the CoMP scheme which the UE hypothesizes, being muted, or assumed to be interfering, hence three types of operations/hypotheses are possible. In the broader aspects of these teachings more or less than three types of operation may be possible for CoMP transmission points, but for specific implementation in LTE/LTE-A currently there are only three options. These indications are used by the UE in its CSI computation and are also indicated to the eNB (or scheduling entity) as an indication of assumptions made behind the reported CSI feedback.

The size of the codebook used by the various entities scales with the number of transmission points. The CoMP scheme selection codebook feedback may be transmitted to the eNB either periodically or aperiodically (for example, only when the UE changes its hypothesis from that which it previously signaled). In one particular embodiment the codebook is also configurable for wideband use or frequency selective use. Use of this configurability option may depend on the CoMP schemes that are possible for use in a given radio environment, and on the available UL capacity.

Continuing with the examples in which there are only three types of CoMP operation for the various transmission points, the codewords consist of entries for each transmission point indicating whether the scheme corresponding to that particular codeword assumes a given transmission point was assumed transmitting the CoMP signal for which CSI feedback was computed (value 1 in the example codewords below), was assumed blanking/muting during transmission of the CoMP signal (value 0 in the example codewords below) or was assumed interfering with the CoMP transmission signal (value I in the example codewords below). As one example, if we assume there are N=3 transmission points, the codeword [1, 0, I] indicates the CoMP transmission hypothesis of transmitting from the first transmission point, blanking by the second transmission point, and transmitting interference from the third transmission point. As another example for N=3 the codeword [1, 1, I] corresponds to the CoMP hypothesis of joint transmission from the first and second transmission points and interference from the third transmission point.

Such a CoMP scheme selection codebook can be used in various ways to control the CoMP transmission and the related feedback. By reporting such a codeword the eNB and the UE will have a common understanding of the transmission hypothesis used by the UE when deriving the CSI feedback that same UE reports, particularly for CQI feedback. Furthermore, in one particular embodiment the UE will only need to report one CoMP CQI in the uplink for the CoMP transmission, which significantly reduces signaling overhead as compared to the UE reporting CQI computed for all possible CoMP hypotheses so the network can choose which one corresponds to the CoMP scheme it actually used in its DL transmission.

The codeword is CoMP feedback which in an embodiment is additional to a baseline or fallback CSI feedback (see for example document R1-112896 mentioned in the background section), where the baseline/fallback CSI feedback is based on a single-point transmission (such as the RI/PMI/CQI feedback). The codeword/additional CoMP scheme selection feedback is such that the UE reports the PMIs and a CQI corresponding to the CoMP assumptions which are identified by the CoMP selection codeword. While above it was noted that the UE need only send one CoMP CQI, in another embodiment for a system which allows more feedback the UE could report also CoMP feedback corresponding to more than one hypothesis; such as for example two CoMP scheme selection codewords for two different hypotheses and two different CQI values each calculated using a different one of those hypotheses.

Following are particular examples relevant to the LTE/LTE-A systems to more fully describe different aspects of these teachings for how to define and utilize the CoMP scheme selection codebook. In CoMP in the LTE/LTE-A system the network will signal the UE with the CSI-RS resource configuration for multiple points. Those transmission points form the UE's CoMP measurement set. The UE will then measure its RSRP for a common reference symbol (CRS) or for a CSI-RS it has received, and will compute its CSI feedback only for a subset of the CRS/CSI-RS configurations that correspond to the reporting set. In some cases the UE's reporting set may be equal to its measurement set. The number of CSI-RS configurations available in the reporting set are also giving one dimension of the CoMP scheme selection codebook, the value of N (N=3 in the above examples). In this manner the codebook scales for the number of transmission points as noted above; for this case the UE can ignore all portions of the CoMP scheme selection codebook other than the N=3 codewords.

For the CoMP reporting set, in the configurable codebook embodiment mentioned above the UE will choose either for wideband, or for each sub-band, the codeword entry from the CoMP scheme selection codebook that provides the best performance (for example, the best performance might be defined as the highest throughput). Then the UE will use that best-performance CoMP scheme selection codeword to see how it should calculate CQI, do the calculation as prescribed, and report the computed PMI/CQI and also the selected CoMP scheme selection codeword to the network.

The UE may select from the entire CoMP scheme selection codebook, or from some restricted subset of the CoMP scheme selection codebook which the network restricts for this UE. In embodiments in which the UE controls its CoMP scheme selection (and thus selects from the entire CoMP selection scheme codebook), the UE selects the transmission scheme most suitable to it at a given time such as by maximizing a specific metric as noted above. Additionally the UE may feedback the required RI/PMI/CQIs accompanied by the CoMP scheme selection codeword. As an example, this may mean the UE feeding back a distinct PMI for each transmission point which corresponds at least to each "1" value in the codeword. In some embodiments the UE will also feedback a PMI value for each transmission point which corresponds to each "I" value in the codeword, in order to enable coordinated beamforming (CB). There may be an additional CQI which assumes there is a transmission from the serving point and which further assumes interference from other transmission points (for example, by default transmit CQI for the [1, I, I] codeword). If the eNB deviates from the scheme selection decided by the UE, the eNB has the possibility to correctly scale the CQI since the codeword informs the network of the assumptions the UE used to compute the CQI feedback it reported.

In embodiments in which the network restricts the UE's CoMP selection scheme codeword selection to only a subset of the whole codebook, preferably the CoMP selection scheme codebook is organized in such a manner that this can be efficiently done at the UE side. So for example the network may configure the UE to adopt a CoMP mode that is supported by the network, this configuration represents the network's restricting which portions of the codebook the UE can use. If the network's CoMP configuration of the UE does not include CB/CS, then in the above LTE-LTE-A examples the UE would only select a codeword from those portions of the CoMP scheme selection codebook that reflect either JT or DPS CoMP schemes and the CB/CS related codewords are not viable selections for the UE. In the extreme the eNB will configure the UE for CoMP such that there is only one codeword in the network-restricted subset of the codebook, in which case the UE would derive/compute the feedback according to that single codeword in all cases (until the network changes its CoMP configuration).

In a particular LTE/LTE-A example from the UE's perspective, the UE measures the channel corresponding to multiple points from reference signals (for example, the UE's RS configuration) such as the CSI-RS. If the transmission is wideband or if it is restricted to select sub-bands only, (for the different wideband/frequency-selective feedback embodiments respectively), for each codeword in the CoMP scheme selection codebook the UE computes the corresponding CSI feedback. As noted above, whether wideband transmission or for each sub-band the UE then chooses the codeword that optimizes some predetermined performance metric such as selecting the best CQI. That is, from all the CQIs for the different codewords that the UE computed, the UE selects the best CQI and then knows the single CoMP selection scheme codeword that corresponds to it. If wideband there will be one best CQI and one CoMP selection scheme codeword; if multiple sub-bands there will be one best CQI per sub-band and one CoMP selection scheme codeword corresponding to each of those sub-band specific CQIs. The UE then reports the chosen CoMP selection scheme codeword(s) to the eNB using an uplink transmission channel, such as the physical uplink control channel (PUCCH) or the physical uplink shared channel (PUSCH). Finally the UE reports the CQI/PMI feedback corresponding to the scheme selection codeword.

The same example from the eNB's perspective finds the eNB configuring the UE with the CoMP measurement set, and the corresponding CSI-RS resources. This portion is conventional in LTE/LTE-A. In one embodiment the eNB may also configure the UE to operate only on a part of the CoMP scheme selection codebook (as noted above, in the extreme the network-restricted subset of the codebook may represent only a single codeword if for example the network operates with only one CoMP scheme). The eNB then receives the codeword(s) selected by the UE if the size of the codebook subset was greater than one codeword. The eNB receives the CoMP specific RI/PMI/CQI feedback corresponding to the CoMP selection scheme codeword, and based on the feedback received from multiple UEs the eNB determines a suitable CoMP transmission scheme for the next CoMP transmission to the UE. In one embodiment the network's default option is to follow the UE's recommendation reflected by the CoMP selection scheme codeword, but the eNB could also override the recommendation in which case the network will have to adjust the CQI value reported by the UE according to the actual transmission scheme the network used.

In FIG. 2 the first transmission point 22 is assumed to be the serving point. In an embodiment of these teachings the UE's feedback to the serving point may be independent of the CoMP feedback, and the serving point changes with normal handover (that is, when the UE 20 hands over to the second transmission point 26 then the UE's feedback to the second transmission point 26 is independent of the UE's CoMP feedback).

Or in another alternative embodiment the serving point feedback may be part of the CoMP scheme selection, such as for example first entry of the codeword [1, I, I] corresponds to the serving point. Since the serving point is always transmitting, in this case the eNB will have to signal to the UE which of the CSI-RS configurations corresponds to the serving point, or alternatively the UE selects the serving cell and indicates in signaling to the eNB which point the UE selected as such. In this case the codebook can be arranged such that the first entry in the every codeword corresponds to the serving point, so that the value "1" in the above codeword examples indicates the UE's per point CSI assumption. If for example, three CSI-RS configurations are part of the reporting set, then the following codeword options are possible:

[1, 0, I]
[1, I, 0, I]
[1, 1, 0]
[1, 0, 1]
[1, I, 1]
[1, 1, I]
[1, I, I]
[1, 0, 0]
[1, 1, 1]

The above example does not include full DPS/muting since the serving point is not changing and it is assumed always as being a point that is transmitting to the UE. The serving point CQI/PMI/RI acts as a fallback mode, which would correspond to the codeword [1, I, I]. In an embodiment the fallback feedback could be per point feedback to any transmission point, and the CoMP scheme selection codebook may be defined as with respect to the "fallback" transmission point. In this case the UE would select the serving cell point based on DPS principles.

For the case in which the network restricts the UE's codeword selection to only a subset of the whole codebook the uplink signaling can be further reduced as compared to the above whole-codebook example in which the UE computes the CQI for every codebook entry to find the best one. For example, this reduction can be achieved by grouping the codewords so that an even smaller number of total bits are fed back. For example for the nine codeword options above there are five codewords for the muting option (those with a "0" value) and five codewords for coherent or non-coherent joint transmission (those with more than a single "1" value).

In this regard following is another example from the UE's perspective. First, the UE receives from the network the CSI-RS configuration measurement set. Based on the computed RSRP, the UE knows the relative power differences between the transmission points in the measurement set. Further selection of the schemes is possible at either the eNB or at the UE. From the UE's perspective it can use the relative power differences to restrict its codeword options as follows:

JT: for points exhibiting similar power, the UE can proceed with JT type of codewords/hypothesis evaluation, and hence the UE evaluates the codewords [1, 1, 0]; [1, 0, 1]; [1, I, 1]; [1, 1, I]; [1, 1, 1].

DPS without muting: If a large power imbalance between points is measured, the UE evaluates the DPS type of hypotheses, hence the UE evaluates the codewords [1, I, I]; [I, 1, I]; [I, I, 1].

DPS with muting assumption (only one point is muted), hence the UE evaluates the codewords: [1, 0, I]; [0, 1, I]; [1, I, 0]; [I, 1, 0]; [I, 0, 1]; [0, I, 1]

For a specific codeword, the UE is free to evaluate both per point and aggregated CQI. For example, codeword [1, 1, I] indicates that feedback needs to be computed for two points, considering the third as an interferer. However the codewords noted in the above examples do not inform the eNB if aggregated feedback is computed. If aggregated CQI is computed, then in this embodiment UE will report in the UL the feedback containers. Thus the existence of the aggregated report will be sufficient to inform the eNB, while the codeword [1, 1, I] will be the only indication needed to fully inform the eNB, based on the assumption behind the computation.

One technical effect of certain embodiments of these teachings is that they enable a common feedback for multiple CoMP schemes without adding to the UE's complexity for calculating CQI. Another technical effect is that compared to other potential solutions these teachings exhibit a lower uplink signaling overhead burden.

Figure 3:
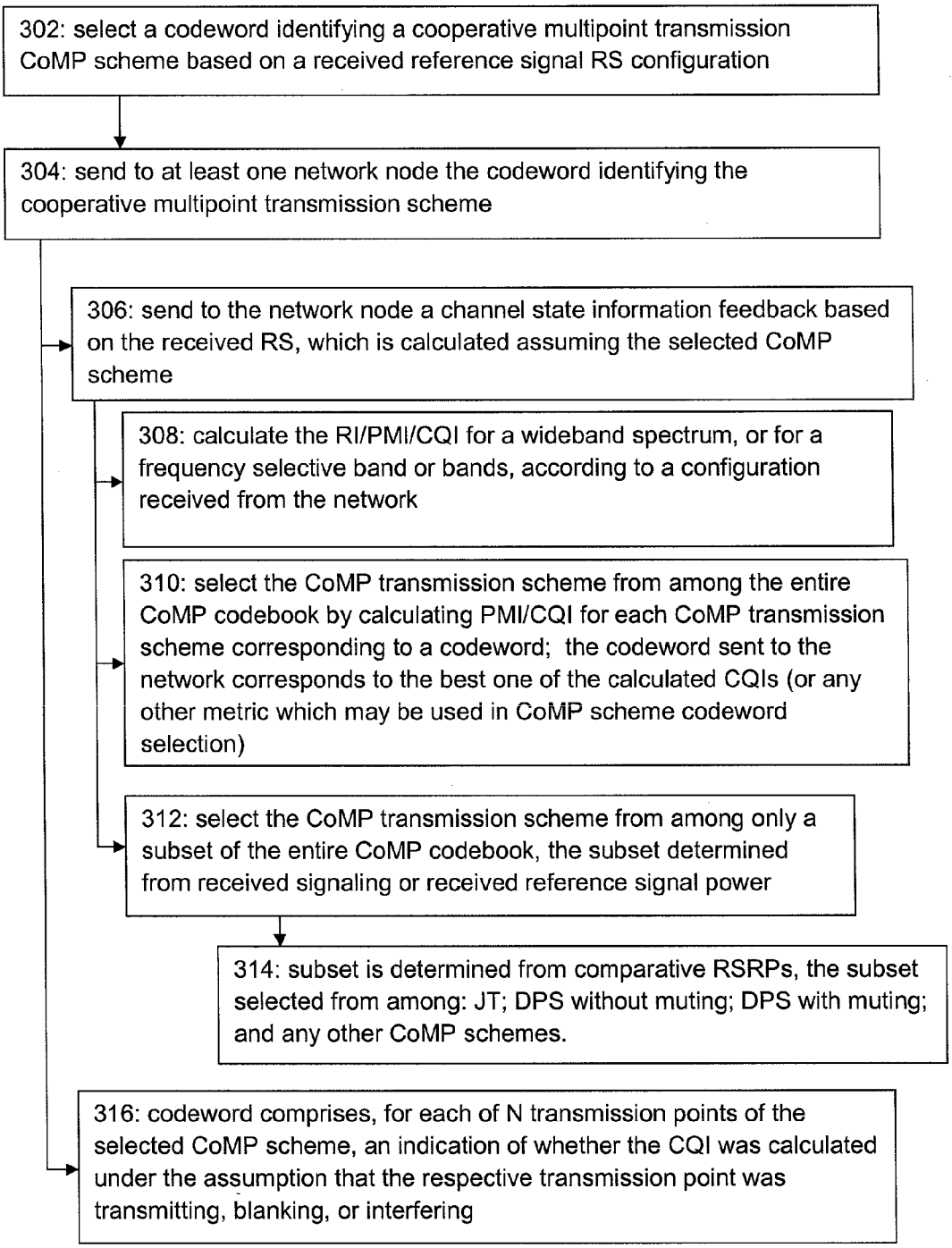
FIG. 3 is a logic flow diagram that illustrates from the perspective of the UE the operation of a method, and a result of execution of computer program instructions embodied on a computer readable memory, in accordance with an exemplary embodiment of this invention.

Now are detailed with reference to FIG. 3 further particular exemplary embodiments from the perspective of the user equipment. FIG. 3 may be performed by the whole UE 20, or by one or several components thereof such as a modem. At block 302 the UE 20 selects a codeword identifying a CoMP transmission scheme based on at its received reference signal configuration. At block 304 the UE 20 sends to at least one network node (the eNB/first transmission point 22) the codeword identifying the CoMP transmission scheme.

Further portions of FIG. 3 represent various of the specific but non-limiting embodiments detailed above. At block 306 the UE further sends to the at least one network node a channel state information (for example, RI/PMI/CQI) based on the received reference signal configuration, in which the channel state information is calculated assuming the selected CoMP transmission scheme.

Block 308 follows from block 306, and summarizes that the UE calculates the channel state information measure (RI/PMI/CQI in the above examples), according to a wideband/frequency selective configuration received from the at least one network node, for a wideband spectrum over which the at least one reference signal was received or for a frequency selective band or bands over which the at least one reference signal was received.

Block 310 also follows from block 306, and summarizes that the UE selects the CoMP transmission scheme from among the entire CoMP scheme selection codebook by calculating a channel quality indication (or other predetermined metric) for each CoMP transmission scheme corresponding to a codeword and selecting a best one of the calculated channel quality indications/metrics. The codeword identifying the selected CoMP transmission scheme corresponds to the best one of the calculated channel quality indications/metrics (such as CQI, maximizing throughput, or other means).

Block 312 also follows from block 306, where the UE selects the CoMP transmission scheme from among only a subset of the entire CoMP scheme selection codebook, the subset determined from signaling (or reference signal power) received from the at least one network node. Block 314 further details block 312 in that the subset is determined from comparative received powers of multiple reference signals (RSRPs) received by the UE, the subset selected from among the group: joint transmission JT; dynamic point selection DPS without muting; and dynamic power selection DPS with muting.

Block 316 is more general in that it details the codeword itself as comprising, for each of N transmission points of the selected CoMP transmission scheme, an indication of whether the channel state information measure (CQI in the above examples) was calculated under the assumption that the respective transmission point was transmitting, blanking, or interfering. In this case N is an integer greater than one.

Further embodiments not shown at FIG. 3 include channel state information measure, which is taken from the received RS configuration, comprising at least one rank indicator RI, at least one precoding matrix index PMI and only a single channel quality indication CQI. Or alternatively the UE can send two or more channel state information measures (different CQIs) and their corresponding CoMP scheme codeword. In this latter embodiment the UE selects at least two different cooperative multipoint transmission schemes based on the received reference signal configuration, sends to the eNB at least two different codewords each identifying a different one of the at least two estimated cooperative multipoint transmission schemes, and also sends to the eNB at least two different channel state information measures each calculated using a different one of the at least two estimated cooperative multipoint transmission schemes.

Figure 4:
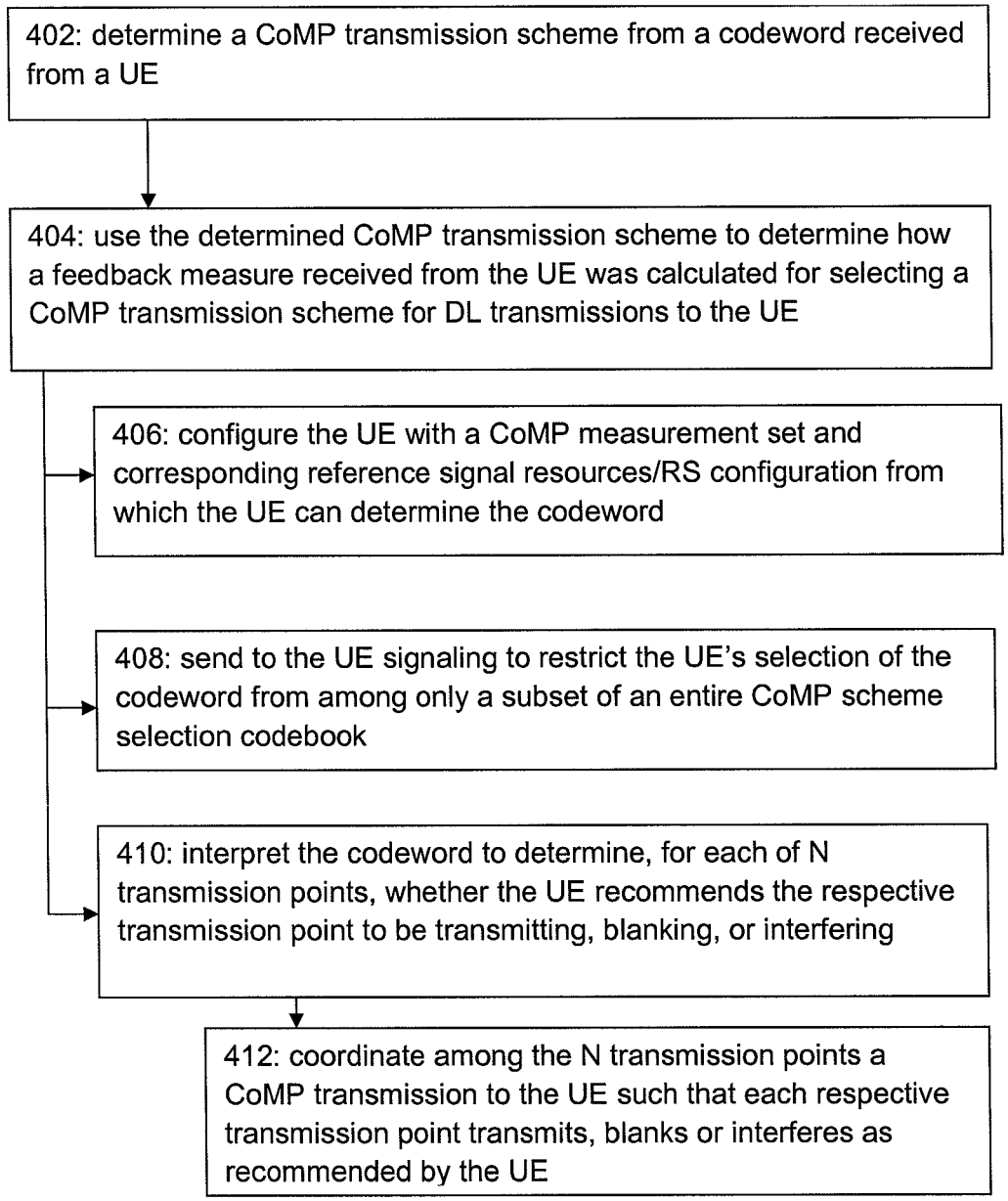
FIG. 4 is a logic flow diagram that illustrates from the perspective of the network node/eNB the operation of a method, and a result of execution of computer program instructions embodied on a computer readable memory, in accordance with an exemplary embodiment of this invention.

FIG. 4 summarizes particular exemplary embodiments from the perspective of the network/eNB. FIG. 4 may be performed by the whole eNB 22, or by one or several components thereof such as a modem. At block 402 the eNB determines a CoMP transmission scheme from a codeword received from a UE, and at block 404 the eNB uses the determined CoMP transmission scheme to determine how a feedback measure (in the above examples, the channel state information measure or more particularly the RI/PMI/CQI) received from the UE was calculated. The eNB then uses this information in its own selection of a CoMP transmission scheme for DL transmissions to the UE. Typically but not always the eNB will use the scheme indicated by the UE's codeword.

Further portions of FIG. 4 reflect some of the non-limiting embodiments detailed above. At block 406 the eNB further configures the UE with a CoMP measurement set and corresponding reference signal resources from which the UE can determine the CoMP scheme selection codeword and the corresponding feedback measure/channel state information.

At block 408 the eNB further sends to the UE signaling to restrict the user equipment's selection of the CoMP scheme selection codeword from among only a subset of an entire CoMP scheme selection codebook. Note that block 408 in the LTE system examples above will typically take place prior to determining from the received codeword the UE's assumed CoMP transmission scheme which is noted at block 402.

Block 410 gives more particulars of block 404 as to how the feedback measure received from the UE was determined. Specifically, the eNB interprets the CoMP scheme selection codeword to determine, for each of N transmission points, whether the user equipment recommends the respective transmission point to be transmitting, blanking, or interfering. In this case also N is an integer greater than one.

Block 412 follows from block 410 and represents the network adopting the UE's recommended CoMP scheme for its next CoMP transmission to the UE. Specifically, the eNB coordinates among the N transmission points a CoMP transmission to the UE such that each respective transmission point transmits, blanks or interferes as recommended by the UE at block 410. Note that the network is not bound by the UE's recommendation, block 412 simply presents that outcome.

Each of FIGS. 3-4 is a logic flow diagram which may be considered to illustrate the operation of a method, and a result of execution of a computer program stored in a computer readable memory, and a specific manner in which components of an electronic device are configured to cause that electronic device to operate. The various blocks shown in each of FIGS. 3-4 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Figure 5:
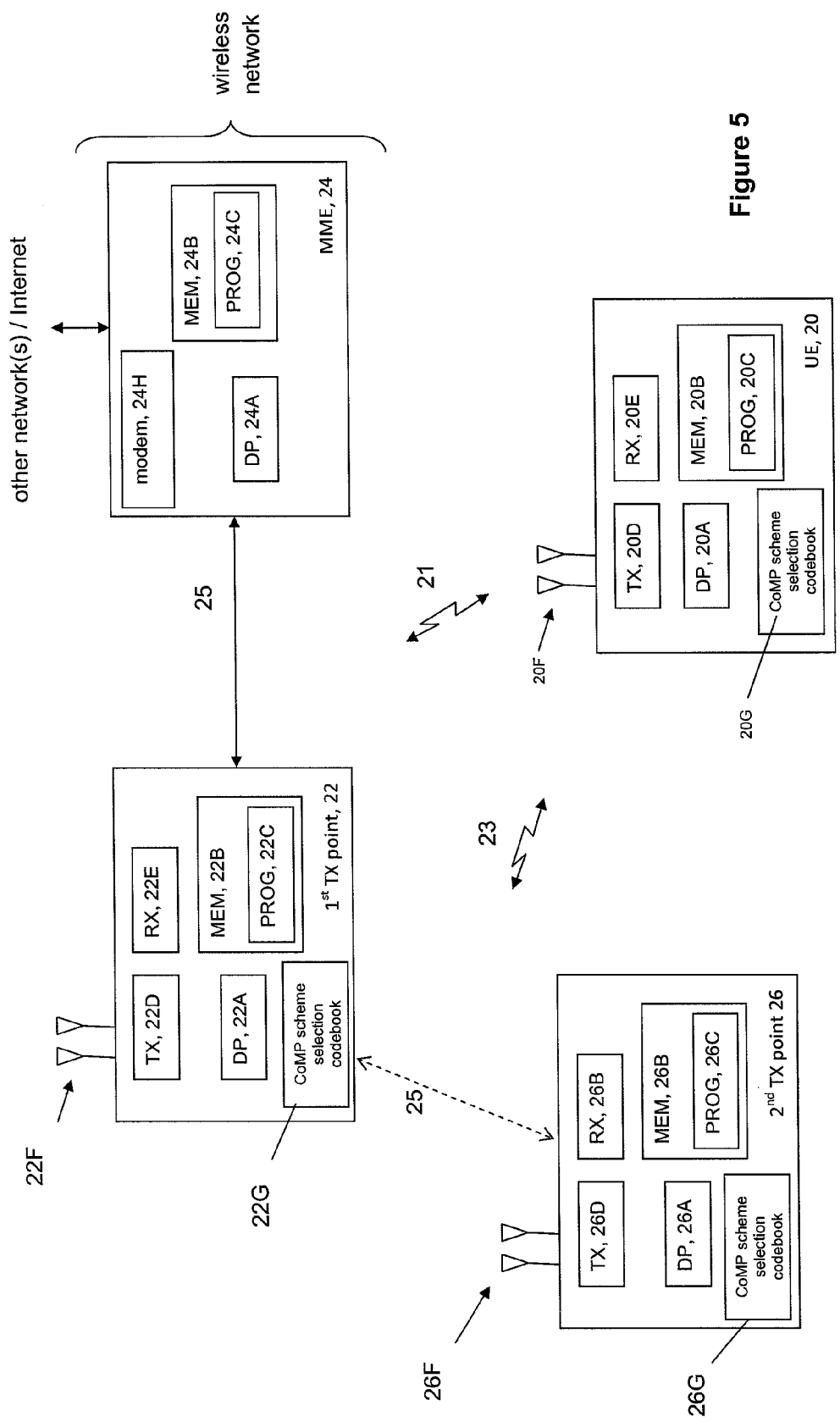
FIG. 5 is a simplified block diagram of the UE and two cells from FIG. 1 and also a higher network node, which are exemplary electronic devices suitable for use in practicing the exemplary embodiments of this invention.

Reference is now made to FIG. 5 for illustrating a simplified block diagram of various electronic devices and apparatus that are suitable for use in practicing the exemplary embodiments of this invention. In FIG. 5 a wireless network (serving cell/eNB/first transmission point 22, second transmission point 26, and mobility management entity MME 24 if an LTE system) is adapted for communication over a wireless links 21 with an apparatus, such as a mobile terminal or UE 20. The mobility management entity 24 may provide connectivity with further networks such as for example a publicly switched telephone network PSTN and/or a data communications network/Internet.

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the eNB 22 and with the second transmission point 26 (and third, fourth etc. transmission points as the case may be) via one or more antennas 20F. Also stored in the MEM 20B at reference number 20G is the CoMP transmission scheme selection codebook which is detailed further above. Similar such codebooks are stored in the MEMs 22B, 26B of the network nodes 22, 26 also as indicated by reference numbers 22G and 26G.

The serving cell 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. The neighbor cell is functionally similar with blocks 26A, 26B, 26C, 26D and 26E. There is also a data and/or control path 25 coupling the neighbor cell 26 and the serving cell 22 to the mobility management entity 24 (via an eNB if neither the first nor the second transmission point is the eNB itself).

Similarly, the mobility management entity 24 includes processing means such as at least one data processor (DP) 24A, storing means such as at least one computer-readable memory (MEM) 24B storing at least one computer program (PROG) 24C, and communicating means such as a modem 24H for bidirectional communications with the transmission points 22, 26 via the data/control path 25. While not particularly illustrated for the UE 20 or transmission points 22, 26, those devices are also assumed to include as part of their wireless communicating means a modem which may be inbuilt on an RF front end chip within those devices 20, 22, 26 and which also carries the TX 20D/22D/26D and the RX 20E/22E/26E.

At least one of the PROGs 20C in the UE 20 is assumed to include program instructions that, when executed by the associated DP 20A, enable the device to operate in accordance with the exemplary embodiments of this invention, as will be discussed below in greater detail. The cells 22, 26 and mobility management entity 24 may also have software to implement certain aspects of these teachings for processing and signaling as detailed above. In these regards the exemplary embodiments of this invention may be implemented at least in part by computer software stored on the MEM 20B, 22B, 26B which is executable by the DP 20A of the UE 20 and/or by the DP 22A/26A of the transmission points 22, 26, or by hardware, or by a combination of tangibly stored software and hardware (and tangibly stored firmware). Electronic devices implementing these aspects of the invention need not be the entire UE 20 or transmission points 22, 26, but exemplary embodiments may be implemented by one or more components of same such as the above described tangibly stored software, hardware, firmware and DP, or a system on a chip SOC or an application specific integrated circuit ASIC or a digital signal processor DSP.

In general, the various embodiments of the UE 20 can include, but are not limited to: data cards, USB dongles, cellular telephones; personal portable digital devices having wireless communication capabilities including but not limited to laptop/palmtop/tablet computers, digital cameras and music devices, and Internet appliances.

Various embodiments of the computer readable MEMs 20B and 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A/22A/26A/24A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the E-UTRAN (LTE/LTE-A) system, it should be appreciated that the exemplary embodiments of this invention are not limited for use with only this one particular type of wireless communication system, and that they may be used to advantage in other wireless communication systems such as for example GERAN, UTRAN and others which may use a variety of CoMP transmission schemes.

Further, the various names used in the above description (CSI-RS; CQI; PMI; RI; names of the various channels) are not intended to be limiting in any respect, as different radio technologies may use different terms for similar concepts. Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus comprising:
   at least one processor and at least one memory storing a computer program;
   in which the at least one memory with the computer program is configured with the at least one processor to cause the apparatus to at least:
      select a codeword identifying a cooperative multipoint transmission scheme based on a received reference signal configuration; and
      send to at least one network node the codeword identifying the cooperative multipoint transmission scheme and a channel state information measure based on the received reference signal configuration, in which the channel state information measure is calculated assuming the identified cooperative multipoint transmission scheme.

2. The apparatus according to claim 1, in which the codeword is selected from a cooperative multipoint scheme selection codebook stored in the at least one memory, and the apparatus is configured by the at least one network node to calculate the channel state information measure for a wideband spectrum or for a frequency selective band or bands.

3. The apparatus according to claim 2, in which the apparatus comprises a user equipment which selects the cooperative multipoint transmission scheme from among the entire cooperative multipoint scheme selection codebook by calculating a channel quality indication for each cooperative multipoint transmission scheme corresponding to a codeword and selecting a best one of the calculated channel quality indications; in which the codeword identifying the cooperative multipoint transmission scheme corresponds to the best one of the calculated channel quality indications.

4. The apparatus according to claim 2, in which the apparatus comprises a user equipment which selects the cooperative multipoint transmission scheme from among only a subset of the entire cooperative multipoint scheme selection codebook, the subset determined from signaling or reference signal power received from the at least one network node.

5. The apparatus according to claim 4, in which the subset is determined from comparative received powers of multiple reference signals received by the user equipment, the subset selected from among the group: joint transmission; dynamic point selection without muting; and dynamic power selection with muting.

6. The apparatus according to claim 1, in which the codeword comprises, for each of N transmission points of the identified cooperative multipoint transmission scheme, an indication of whether the channel quality measure was calculated under the assumption that the respective transmission point was transmitting, blanking, or interfering, where N is an integer greater than one.

7. The apparatus according to claim 1, in which the channel state information measure sent to the at least one network node comprises at least one rank indicator, at least one precoding matrix index and a single channel quality indication.

8. The apparatus according to claim 1, in which the at least one memory with the computer program is configured with the at least one processor to cause the apparatus to at least:
   select at least two different cooperative multipoint transmission schemes based on the received reference signal configuration;
   send to the at least one network node at least two different codewords, each identifying a different one of the at least two estimated cooperative multipoint transmission schemes; and
   send to the at least at least one network node at least two different channel state information measures, each calculated using a different one of the at least two estimated cooperative multipoint transmission schemes.

9. A method comprising:
   selecting a codeword identifying a cooperative multipoint transmission scheme based on a received reference signal configuration; and
   sending to at least one network node the codeword identifying the cooperative multipoint transmission scheme and a channel state information measure based on the received reference signal configuration, in which the channel state information measure is calculated assuming the identified cooperative multipoint transmission scheme.

10. The method according to claim 9, in which the codeword is selected from a locally stored cooperative multipoint scheme selection codebook, the method further comprising calculating the channel state information measure, according to a configuration received from the at least one network node, for a wideband spectrum or for a frequency selective band or bands.

11. The method according to claim 10, in which the method is executed by a user equipment which selects the cooperative multipoint transmission scheme from among the entire cooperative multipoint scheme selection codebook by calculating a channel quality indication for each cooperative multipoint transmission scheme corresponding to a codeword and selecting a best one of the calculated channel quality indications; in which the codeword identifying the cooperative multipoint transmission scheme corresponds to the best one of the calculated channel quality indications.

12. The method according to claim 9, in which the method is executed by a user equipment and:
  the codeword is selected from a cooperative multipoint scheme selection codebook stored in a memory of the user equipment;
  the user equipment is configured by the at least one network node to calculate the channel state information measure for a wideband spectrum or for a frequency selective band or bands;
  the user equipment selects the cooperative multipoint transmission scheme from among only a subset of the cooperative multipoint scheme selection codebook, the subset determined from signaling or reference signal power received from the at least one network node; and
  the subset is determined from comparative received powers of multiple reference signals received by the user equipment, and the subset is selected from among the group: joint transmission; dynamic point selection without muting; and dynamic power selection with muting.

13. The method according to claim 9, in which the codeword comprises, for each of N transmission points of the identified cooperative multipoint transmission scheme, an indication of whether the channel quality measure was calculated under the assumption that the respective transmission point was transmitting, blanking, or interfering; where N is an integer greater than one.

14. An apparatus comprising:
  at least one processor and at least one memory storing a computer program;
  in which the at least one memory with the computer program is configured with the at least one processor to cause the apparatus to at least:
    configure a user equipment with a cooperative multipoint measurement set and corresponding reference signal resouces;
    determine a cooperative multipoint transmission scheme from a codeword received from the user equipment, the codeword depending on the configured cooperative multipoint measurement set and corresponding reference signal resources; and
    use the determined cooperative multipoint transmission scheme to determine how a feedback measure received from the user equipment was calculated for selecting a cooperative multipoint transmission scheme for downlink transmissions to the user equipment.

15. The apparatus according to claim 14, in which the at least one memory with the computer program is configured with the at least one processor to cause the apparatus to further send to the user equipment signaling to restrict the user equipment's selection of the codeword from among only a subset of an entire cooperative multipoint scheme selection codebook.

16. The apparatus according to claim 14, in which the at least one memory with the computer program is configured with the at least one processor to cause the apparatus to further interpret the codeword to determine, for each of N transmission points, whether the user equipment recommends the respective transmission point was to be transmitting, blanking, or interfering, where N is an integer greater than one.

17. The apparatus according to claim 16, in which the at least one memory with the computer program is configured with the at least one processor to cause the apparatus to further coordinate among the N transmission points a cooperative multipoint transmission to the user equipment such that each respective transmission point transmits, blanks or interferes as recommended by the user equipment.

18. A method comprising:
  configuring a user equipment with a cooperative multipoint measurement set and corresponding reference signal resources;
  determining a cooperative multipoint transmission scheme from a codeword received from the user equipment, the codeword depending on the configured cooperative multipoint measurement set and corresponding reference signal resources; and
  using the determined cooperative multipoint transmission scheme to determine how a feedback measure received from the user equipment was calculated for selecting a cooperative multipoint transmission scheme for downlink transmissions to the user equipment.

19. The method according to claim 18, the method further comprising interpreting the codeword to determine, for each of N transmission points, whether the user equipment recommends the respective transmission point to be transmitting, blanking, or interfering, where N is an integer greater than one.

20. The method according to claim 19, the method further comprising coordinating among the N transmission points a cooperative multipoint transmission to the user equipment such that each respective transmission point transmits, blanks or interferes as recommended by the user equipment.

* * * * *

UNITED STATES PATENT AND TRADEMARK OFFICE
CERTIFICATE OF CORRECTION

| | | |
|---|---|---|
| PATENT NO. | : 8,855,026 B2 | Page 1 of 1 |
| APPLICATION NO. | : 13/291417 | |
| DATED | : October 7, 2014 | |
| INVENTOR(S) | : Helka-Liina Maattanen et al. | |

It is certified that error appears in the above-identified patent and that said Letters Patent is hereby corrected as shown below:

In the Claims,

Claim 8, column 14, line 53: Replace "send to the at least at least one network node at least two" with --send to the at least one network node at least two--.

Claim 14, column 15, lines 52 through 53: Replace "reference signal resouces" with --reference signal resources--.

Signed and Sealed this
Twenty-fourth Day of March, 2015

Michelle K. Lee
*Director of the United States Patent and Trademark Office*